June 29, 1926.
A. R. K. DJURSON
1,590,502
AUTOMATIC SLACK ADJUSTER FOR RAILWAY BRAKES AND THE LIKE
Filed Feb. 5, 1926
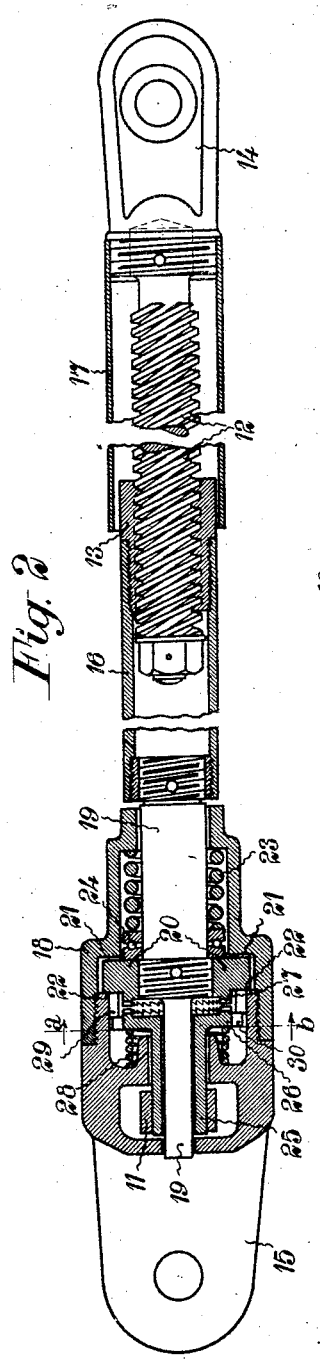
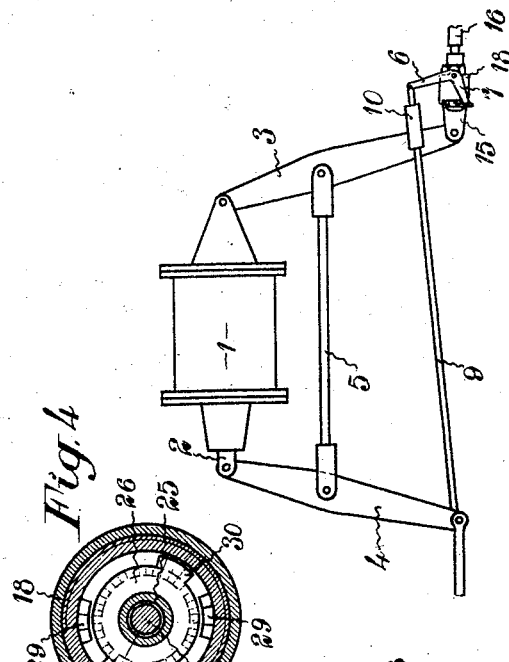
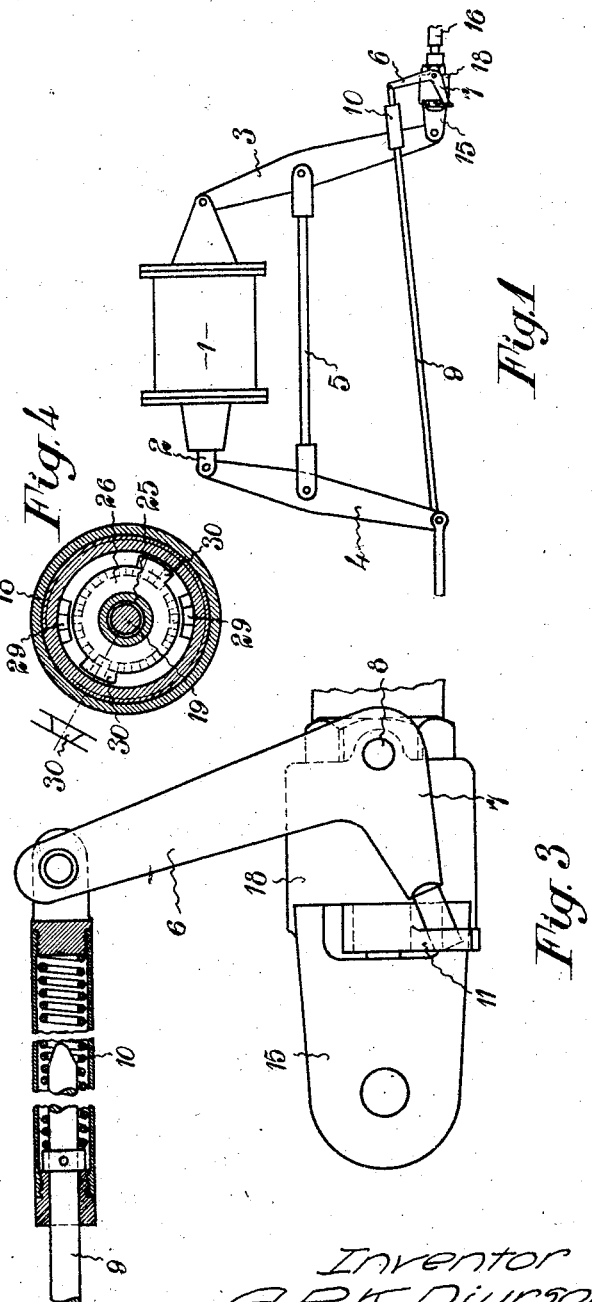
Inventor
A.R.K. Djurson
by
Langner, Parry, Card & Langner
Attys.

Patented June 29, 1926.

1,590,502

UNITED STATES PATENT OFFICE.

AXEL RUDOLF KONRAD DJURSON, OF MALMO, SWEDEN, ASSIGNOR TO SVENSKA AKTIEBOLAGET BROMSREGULATOR, OF MALMO, SWEDEN, A CORPORATION OF SWEDEN.

AUTOMATIC SLACK ADJUSTER FOR RAILWAY BRAKES AND THE LIKE.

Application filed February 5, 1926, Serial No. 86,344, and in Sweden March 14, 1925.

This invention relates to an automatic slack adjuster for brakes, and particularly for brakes for railway carriages and the like.

The object of the invention is to provide an improved device of this character having certain novel features of construction and operation hereinafter set forth.

In slack adjusters for railway brakes and the like of the type hitherto in use including such slack adjusters which are adapted to enlarge as well as to reduce the slack between the brake shoes and the wheels, difficulties have arisen for the reason that, upon the unloading of a loaded carriage, the slack has been suddenly reduced with the consequence that not only the length of stroke of the piston in the brake cylinder has been kept under its normal value but also in some cases the carriage wheels have been entirely locked, so that a comparatively great number of braking operations will be necessary to restore the slack to its normal value.

The object of this invention is to eliminate this drawback and to render possible the restoration of the proper slack by means of a single braking operation. The invention particularly relates to slack adjusters in which a screw and nut device, that is an adjuster screw with cooperating nut means is used for increasing and decreasing respectively the slack, the rotary movement of the screw and nut device being dependent on a compulsorily controlled blocking device. The characteristic feature of the invention substantially consists in that the angle of inclination of the threads of the screw and nut device is chosen so great as to avoid a self-locking of the device, so that the latter may be operated simply by the action of the tension which arises in the brake rigging when the brake is applied, provided the compulsorily controlled blocking device is so set as to permit such operation.

The invention is illustrated in the accompanying drawing, in which Figure 1 on a reduced scale shows a diagrammatic elevation of the general arrangement of a brake cylinder and associated parts including a portion of the improved slack adjuster. Figure 2 shows in a larger scale a longitudinal section through the improved slack adjuster. Figure 3 is a side elevation of the one end of the slack adjuster including a member for the transfer of movement, some parts being shown in section. Figure 4 is a transverse section on the line $a$—$b$, Fig. 2 looking in the direction of the arrows, an element being shown outside of Figure 4 in a side elevation.

Referring to Fig. 1 the brake cylinder, adapted for instance for compressed air, is denominated as 1 and the rod of its piston as 2. The usual brake levers 3 and 4 are joined by the connecting rod 5 of unvariable length intermediate their ends, while their lower ends are connected to the brake bars. The lever 3 is jointed to a bracket on the brake cylinder, while the lever 4 is jointed to the outer end of the piston rod 2, which extends from the piston through one end of the brake cylinder 1. When braking pressure is applied the piston and piston rod 2 are pressed outwardly so that the lower ends of the brake levers 3 and 4 approach each other. The slack adjusting device may be mounted in one of the brake bars near its joint with the brake lever. The position of the slack adjusting device in Fig. 1 is intimated as 16, 18.

The movement necessary for the operation of the slack adjuster may be obtained through the intermediary of a bell crank lever 6, 7 pivotally mounted on a stud 8 fixed to a part of the slack adjuster (see also Fig. 3). The one branch 6 of the bell crank lever is jointed to an adjuster rod 9 which is jointed at its other end to the lower end of the brake lever 4, a resilient device 10 being inserted in the rod 9 and forming a resilient portion thereof. When upon the application of the brake pressure, the lower ends of the brake levers approach each other a certain pressure is applied to the rod 9 which is transferred in the form of a longitudinal movement to the branch 6 of the bell crank lever which in its turn will swing about its pivot 8. The end of the other branch 7 of the bell crank lever is jointed to a member 11 to be hereinafter described. If the resistance opposed to the movement of the rod 9 becomes too great, the transfer of such movement through the intermediary of the bell crank lever 6, 7 ceases, and the excessive pressure applied to the rod will be absorbed by the resilient member 10 which may consist of a helically wound compression spring.

It, however, is to be understood that the general arrangement of the slack adjusting device above described is to be considered a preferred form of embodiment and may be varied within very wide limits in accordance with the construction of the brake system employed, the main fact of importance for the invention being that movement is transferred to the slack adjuster preferably through the intermediary of a resilient member which causes the movement to cease, when the resistance opposed to such movement reaches a predetermined maximum value. Thus, the movement may be also transferred in the form of a pull instead of a pressure, and further the resilient member may consist of a tension spring instead of a compression spring.

In the slack adjuster (Figs. 2 and 4) the actual adjusting device consists as usually of an adjuster screw 12 and nut means 13 cooperating therewith but as a differentiation from constructions hitherto known the screw and nut means are provided with threads the pitch of which is so great that the screw and nut members are not self-locking, that is to say that the nut member, for instance, is subjected to a rotary movement when a sufficiently great pressure or pull is applied to the screw member. The screw and nut device is preferably provided with multiplex threads. The screw 12 is securely fixed to a coupling socket 14 for one of the brake bars (not shown) and the nut member 13 is freely rotatably but axially not displaceably connected to another coupling socket 15 which is jointed to the lower end of the brake lever 3 (Fig. 1). It therefore is obvious that a rotary motion of the nut member 13 relatively to the adjuster screw 12 causes a lengthening or shortening of the distance between the points of fixation of the coupling sockets 14 and 15, which results in a corresponding increase or decrease of the slack between the brake shoes and the carriage wheels. From this it will be observed that it is immaterial whether the screw or the nut receives a rotary movement, while the other member remains stationary, as a rotary motion of the one member in relation to the other member is the essential factor. The portion of the brake bar in which the slack adjuster is fitted may be carried out in the form of a tube 16, as shown in Fig. 2, said tube carrying the nut member 13. The tube 16 forms a protective casing for the portion of the screw 12 which is projecting from the one side of the nut 13 and another protective casing 17 is arranged about the other projecting portion of the screw 12 and fixed to the coupling socket 14, the tube 16 telescoping in the casing 17.

The blocking device which determines the adjusting effect of the slack adjuster is mounted within a housing 18 which preferably is integral with the coupling socket 15. Through the one end of the housing 18 extends a spindle 19, which is securely fixed to the tube 16 and thus connected with the nut member 13. To the spindle 19 is attached within the housing 18 a flange like member 20, the axial surfaces of which are alternatively in contact with correspondent friction surfaces 21 and 22 provided for this purpose within the housing 18. In the position of the parts shown in Figure 2 the flange like member 20 is assumed to be in frictional contact with the friction surface 22. The flange 20 is kept in this position, when the brakes are in "off" position, by means of a powerful compression spring 23 mounted within the housing 18 and operating on the flange like member 20 through the intermediary of an anti-friction bearing 24 for the purpose of reducing the friction produced by the rotation of the spindle 19. About a portion of the spindle 19 preferably having a smaller diameter a coupling member 25 is journalled which has a flange 26 provided with axially extending ratchet teeth which are adapted to cooperate with corresponding ratchet teeth 27 axially extending from the flange like member 20, this latter serving as the other coupling member of the blocking device. A compression spring 28 of smaller dimensions than the spring 23 and arranged between the flange 26 and a flange like extension within the housing 18 permanently tends to bring the coupling members 26 and 27 in engagement with each other. The member 11 referred to above and cooperating with the bell crank lever 6, 7 (Figs. 1 and 3) is a forked crank which at least periferally is securely fixed to the coupling member 25, and thus it is this coupling member to which the movement of the rod 9 is transferred through the intermediary of the resilient member 10, the bell crank lever 6, 7 and the crank 11. For compulsorily controlling the blocking device formed by the two coupling members 26 and 27, 20 the housing 18 is provided on its interior walls with a number, preferably two, fixed projections 29 adapted to cooperate with corresponding projections 30 radially extending from the flange 26 of the coupling member 25. These projections 29 and 30 are provided with inclined surfaces at the sides facing each other, preferably in both directions, so that they comparatively easily may glide one upon the other, the interengagement of the ratchet teeth of the two coupling members being released by surpressing the power of the spring 28 (the position as shown in Fig. 2) while the interengagement of said ratchet teeth is automacally effected by means of said spring 28, when the above described projections 29 and 30 are out of registering position with each other (the position shown in Fig. 4).

When the brake is applied, two forces are produced, which are of importance for the proper function of the device. These forces are:—firstly, a force which hereafter may be called the controlling force and which is produced in the rod 9. This force acts through the intermediary of the bell crank lever 6, 7 and the crank 11 in the form of a rotary motion upon the coupling member 26, and secondly, a force in the tube 16 (that is part of one of the brake bars), which force is a function of the braking pressure and usually is in the form of a tension (but may also be a compression). This force may be called braking force. As the controlling force effects a rotary motion on the coupling member 26 and when this latter is in engagement with the other coupling member 27, 20 the nut member 13 consequently receives a rotary motion, provided the braking force has not reached a value which is greater than the value of the controlling force, but should this be the case the surplus movement in the brake rigging will be absorbed in the form of a reserve force in the resilient member 10.

The operation of the device is as follows:— Assuming normal slack between the brake shoes and the wheels and with the brake in "off" position, the projections 29 and 30 rest upon each other and prevent an interengagement of the coupling members 26 and 27, 20. Upon applying the brake until the brake shoes just are in contact with the wheels, the crank 11 is to be turned to a certain predetermined position, in which the projections 29 and 30 have been angularly displaced so that the coupling members 26 and 27, 20 are in engagement with each other. Upon the continuation of the application of the brake pressure, a tension arises in the brake rigging and in consequence thereof the spring 23 is compressed and the flange like member 20 is axially displaced so that it abuts against the friction surface 21. The friction produced between the members 20 and 21 prevents a further rotary motion of the nut member 13 in relation to the screw 12 and the excessive movement of the rod 9 is absorbed in the resilient member 10.

Assuming by way of example, that the slack is too great. Upon the application of the brake pressure and when the crank 11 has reached the above stated predetermined position the braking force will not have reached such value that the spring 23 has been compressed and the flange like member 20 has come into contact with the friction surface 21, so that the nut member 13 will receive a rotary motion by the crank 11, which reduces the slack.

If, on the other hand, the slack has been too little, that is the brake shoes are already in contact with the wheel before the crank 11 has reached its predetermined position, a tension is produced at an earlier stage in the brake rigging and the screw 12, which tension compresses the spring 23 to such a degree that the flange like member 20 is no longer in contact with the friction surface 22, and as in this position of the crank 11 the coupling members 26 and 27, 20 are not in engagement with each other and as the threads of the screw and nut device 12, 13 have a non-locking pitch, any consequent pulling action on the slack adjuster results in a rotary motion of the nut member 13 in relation to the screw 12 and thus in a corresponding lengthening of the slack adjuster, that is the slack will be enlarged.

Thus in both cases the adjustment becomes a function of the tension in the brake rigging, respectively a function of the time in which said tension reaches a normal value corresponding to the power of the spring 23, and in consequence thereof obviously one braking operation only is necessary for bringing the slack to correspond to the normal value of said tension, that is for bringing the slack to reach its normal value.

What I claim and desire to secure by Letters Patent is:—

1. In a slack adjuster for brakes, an adjuster screw and nut means, the angle of inclination of the threads of the adjuster screw and the nut means being so great as to prevent a self-locking of the adjuster screw in the nut means or vice versa, a compulsorily controlled blocking device which is rendered operative during a portion only of the braking operation, the one member of said blocking device being connected to said screw means.

2. In a slack adjuster for brakes, an adjuster screw and nut means, the threads of the adjuster screw and nut means being non-self-locking, a compulsorily controlled blocking device consisting of two members axially displaceable in relation to each other, the one member connected to the nut means, the other member connected with the brake rigging and receiving rotary motion from the latter upon the application of the brake.

3. In a slack adjuster for brakes, a non-self-locking adjuster screw and nut means, two blocking members facing each other and axially displaceable in relation to each other, the one member connected to the nut means, the other member connected with the brake rigging and receiving rotary motion upon the application of the brake, means tending to couple the blocking members together and means for pressing the blocking members apart.

4. In a slack adjuster for brakes, a non-self-locking adjuster screw and nut means, two blocking members axially displaceable in relation to each other, an operative connection between the one member and the brake rigging for rotating the said member upon the application of the brake, the other member connected to the nut means and adapted to be displaced in the one direction by the action of the tension in the brake rigging and in the other direction by the action of a resilient means, a stop means for preventing said other blocking member from rotating when the force of the resilient means is overcome by said tension in the brake rigging.

In testimony whereof I have signed my name to this specification.

AXEL RUDOLF KONRAD DJURSON.